(12) United States Patent
Manjeshwar et al.

(10) Patent No.: US 9,031,300 B1
(45) Date of Patent: May 12, 2015

(54) SYSTEM AND METHOD RECONSTRUCTING A NUCLEAR MEDICINE IMAGE USING DEFORMED ATTENUATION IMAGE

(71) Applicant: General Electric Company, Schenectady, NY (US)

(72) Inventors: Ravindra Mohan Manjeshwar, Niskayuna, NY (US); Sangtae Ahn, Niskayuna, NY (US); Kris Thielemans, London (GB)

(73) Assignee: General Electric Company, Schenectady, NY (US)

( * ) Notice: Subject to any disclaimer, the term of this patent is extended or adjusted under 35 U.S.C. 154(b) by 95 days.

(21) Appl. No.: 14/063,473

(22) Filed: Oct. 25, 2013

(51) Int. Cl.
*G06K 9/00* (2006.01)
*G06T 11/00* (2006.01)

(52) U.S. Cl.
CPC ..................................... *G06T 11/003* (2013.01)

(58) Field of Classification Search
None
See application file for complete search history.

(56) References Cited

U.S. PATENT DOCUMENTS

| | | | |
|---|---|---|---|
| 7,378,660 B2 * | 5/2008 | Case et al. | 250/363.01 |
| 7,787,675 B2 | 8/2010 | Pan et al. | |
| 7,813,783 B2 * | 10/2010 | Thomas et al. | 600/407 |
| 8,098,916 B2 * | 1/2012 | Thielemans et al. | 382/131 |
| 8,175,360 B2 | 5/2012 | Razifar et al. | |
| 8,452,126 B2 * | 5/2013 | Jhunjhunwala et al. | 382/294 |
| 8,600,132 B2 * | 12/2013 | Razifar et al. | 382/128 |
| 8,767,908 B2 * | 7/2014 | Leahy et al. | 378/4 |
| 8,977,027 B2 * | 3/2015 | Da Silva et al. | 382/131 |
| 2008/0208035 A1 * | 8/2008 | Nistler et al. | 600/411 |
| 2010/0046821 A1 * | 2/2010 | Manjeshwar et al. | 382/131 |
| 2010/0098312 A1 * | 4/2010 | Leahy et al. | 382/131 |
| 2012/0281897 A1 * | 11/2012 | Razifar et al. | 382/131 |
| 2013/0026370 A1 | 1/2013 | Qian et al. | |
| 2013/0064769 A1 | 3/2013 | Cesati et al. | |
| 2013/0136328 A1 | 5/2013 | Jansen et al. | |
| 2013/0142411 A1 * | 6/2013 | Da Silva et al. | 382/131 |
| 2015/0066818 A1 * | 3/2015 | Choi et al. | 706/12 |

OTHER PUBLICATIONS

Ay, Mohammad Rez et al. "Computed Tomography Based Attenuation Correction in PET/CT: Principles, Instrumentation, Protocols, Artifacts and Future Trends", Sources of Error and Artifact in CTAC in PET/CT, Jul. 2007, Iran J Nucl Med 2007, vol. 15, No. 2. (Serial No. 28), Retrieved from http://journals.tums.ac.ir, retrieved Oct. 25, 2013, (pp. 1-29, 29 total pages).

(Continued)

*Primary Examiner* — Chan Park
*Assistant Examiner* — Iman K Kholdebarin
(74) *Attorney, Agent, or Firm* — Buckley, Maschoff & Talwalkar LLC

(57) ABSTRACT

According to some embodiments, an emission tomography scanner may acquire emission scan data. One or more anatomical images may be generated using an anatomical imaging system, and the anatomical images may be processed to obtain an initial attenuation image. An emission image and a corrected attenuation image may be jointly reconstructed from the acquired emission scan data, the corrected attenuation image representing a deformation of the initial attenuation image. A final reconstructed emission image may then be calculated based on the reconstructed emission image and/or the corrected attenuation image. The final reconstructed emission image may then be stored in a data storage system and/or displayed on a display system.

25 Claims, 7 Drawing Sheets

(56) References Cited

OTHER PUBLICATIONS

Sun, Tao et al., "Techniques for respiration-induced artifacts reductions in thoracic PET/CT", Quantitative Imaging in Medicine and Surgery, vol. 2, No. 1, Mar. 2012, (pp. 46-52, 7 total pages).

Bai, Wenjai "Respiratory Motion Correction in Positron Emission Tomography", Doctor of Philosophy, Trinity Term, 2010, (cover 2pgs + Abstract 1pg. + Acknowledgement 1pg. + Related Publications i-vi + pp. 1-158, 168 total pages).

* cited by examiner

SYSTEM AND METHOD RECONSTRUCTING A NUCLEAR MEDICINE IMAGE USING DEFORMED ATTENUATION IMAGE

BACKGROUND

The invention relates generally to tomographic imaging and, more particularly, to methods and systems for correcting for motion-induced attenuation mismatch for use in tomographic imaging.

Tomographic imaging has become an integral part of healthcare services. Examples of tomographic imaging include Positron Emission Tomography ("PET") imaging, Single Photon Emission Computed Tomography ("SPECT") imaging, X-ray Computed Tomography ("CT") imaging, and magnetic resonance imaging ("MRI"). In CT imaging, X-rays are propagated through the body and are detected on the other side of the body. The X-rays are attenuated to different degrees depending on encountered bodily structures, resulting in an image showing the structural features of the body. MRI also creates images of the internal structures of the human body by exploiting the property of nuclear magnetic resonance. MRI provides good contrast resolution by using various optimized radio frequency pulse sequences. Note, however, that CT imaging or MRI is not particularly sensitive to biological processes and functions.

On the other hand, PET or SPECT imaging produces images of various biological processes and functions. In PET imaging, a solution including a tracer is injected into a subject or patient to be scanned. The tracer is a pharmaceutical compound including a radioisotope with a relatively short half-life, such as 18F-Fluoro-2-Deoxyglucose ("FDG"), which is a type of sugar that includes radioactive fluorine. The tracer can be adapted such that it is attracted to sites such as lesions within the subject where specific biological or biochemical processes occur. The tracer moves to and is typically taken up in one or more organs of the subject in which these biological and biochemical processes occur. For example, cancer cells may metabolize the tracer, allowing the PET scanner to create an image illuminating the cancerous region. When the radioisotope decays, it emits a positron, which travels a short distance before annihilating with an electron. The short distance, also referred to as the positron range, is typically of the order of 1 mm for FDG in common subjects. The annihilation produces two high-energy photons propagating in substantially opposite directions.

PET imaging uses a photon detector array arranged around a scanning area, usually in a ring-shaped pattern, in which the subject or at least the part of interest of the subject is arranged. When the detector array detects two photons within a short timing window, a so-called "coincidence" is recorded. The line connecting the two detectors that received the photons is called the Line Of Response ("LOR"). The reconstruction of the image is based on the premise that the decayed radioisotope is located somewhere on the LOR. The relatively short positron range may be neglected or may be compensated for in the reconstruction. Each coincidence may be recorded in a list by three entries: two entries representing the two detectors and one entry representing the time of detection. The coincidences in the list may be grouped in one or more sinograms. A sinogram is typically processed using image reconstruction algorithms to obtain volumetric medical images of the subject. However, PET imaging does not generally provide structural details as well as other types of scanners such as CT and MRI scanners.

A PET-CT scanner includes both a CT scanner and a PET scanner installed around a single patient bore. A PET-CT scanner creates a fused image including a PET image spatially registered to a CT image. PET-CT scanners provide the advantage that the functional and biological features shown by the PET scan may be precisely located with respect to the structure illuminated by the CT scan. In a typical PET-CT scan, the patient first undergoes a CT scan, and then the patient undergoes a PET scan before exiting the scanner. After the CT and PET data have been acquired, the PET-CT scanner processes the data and generates a fused PET-CT image.

Patient motion, such as motion due to respiration, may be a significant factor in degrading the quantitative integrity of PET images. Respiratory motion may result in artifacts and/or contrast dilution of lesions from motion blurring. Respiratory-gated acquisition of PET data can reduce motion blur. In a respiratory-gated acquisition, the data is partitioned during each respiratory cycle to produce independent PET images for each partition or gate. Each of these PET images may have reduced motion blur compared to the un-gated image. However, the reduction in blur may come at the expense of increased image noise because each gate has fewer counts than the un-gated image. A PET image, nearly free of respiratory motion, with an improved signal to noise ratio may be generated by an RRA (Reconstruct, Register and Average) procedure wherein the PET images reconstructed independently for each gate are registered and then averaged.

For accurate PET quantitation, it is important to correct for both photon attenuation and respiratory motion. Although the RRA approach using respiratory gated PET data may address respiratory motion blur, a respiratory phase mismatch may exist between an attenuation image that is used in a PET image reconstruction process and each respiratory gated PET data set since the attenuation image may be obtained from a CT image, which is usually taken while the subject is holding his or her breath. This mismatch may generate undesirable artifacts in reconstructed PET images for each gate or the output PET image of the RRA approach, preventing accurate PET quantitation.

It would therefore be desirable to enhance quantitative accuracy in tomographic imaging by providing both attenuation and motion correction in an accurate manner.

BRIEF DESCRIPTION

According to some embodiments, an emission tomography scanner may acquire emission scan data. One or more anatomical images may be generated using an anatomical imaging system, and the anatomical images may be processed to obtain an initial attenuation image. An emission image and a corrected attenuation image may be reconstructed from the acquired emission scan data, the corrected attenuation image representing a deformation of the initial attenuation image. A final reconstructed emission image may then be calculated based on the reconstructed emission image and/or the corrected attenuation image. The final reconstructed emission image may then be stored in a data storage system and/or displayed on a display system.

Other embodiments are associated with systems and/or computer-readable medium storing instructions to perform any of the methods described herein.

DRAWINGS

DETAILED DESCRIPTION

Embodiments disclosed herein include an imaging method for providing motion correction in tomographic imaging. Some embodiments are associated with reconstruction of respiratory-gated PET images using a CT image for PET attenuation correction. Note that patient motion may lead to a mismatch between PET and CT images and result in artifacts in reconstructed PET images. This mismatch may, according to some embodiments, be adjusted between gated PET and CT images. The mismatch adjustment may be performed, for example, in the CT-based attenuation image to correct for motion in a region of interest. An attenuation mismatch may be modeled as a deformation of the initially given CT-based attenuation image and the deformation as well as the PET image for each gate may be jointly estimated from respiratory gated PET data. The resulting estimated deformation may yield a mismatch corrected attenuation image, which may result in a PET image free of attenuation mismatch induced artifacts. As used herein, singular forms such as "a," "an," and "the" include plural referents unless the context clearly dictates otherwise.

Figure 1:
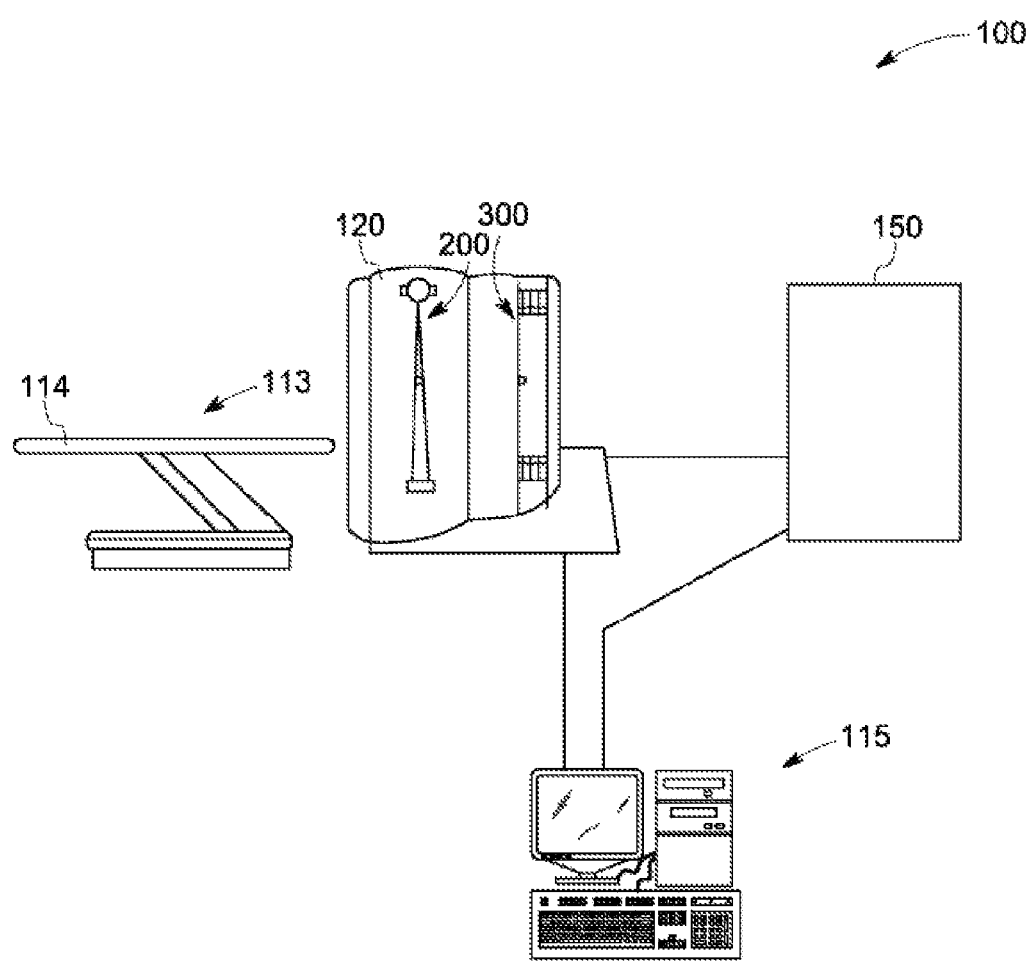
FIG. 1 is a schematic illustration of a PET-CT imaging system.

FIG. 1 illustrates an exemplary embodiment of a PET-CT scanner 100. The PET-CT scanner 100 may include a CT system 200 and a PET system 300 mounted around a bore in a housing 120. The PET-CT scanner 100 may also include a patient table 113, a table bed 114, a processing unit 150, and a control station 115. A patient table controller (not shown) may move the table bed 114 into the bore in response to commands received from the control station 115. The control station 115 may include a display and one or more input devices such as a keyboard, a mouse, or other similar input/controller device. Through the keyboard and associated input devices, the operator may control the operation of the PET-CT scanner 100 and the display of the resulting image on the display.

The processing unit 150 may include one or more processors, one or more memories, and other associated electronics for image processing. The processing unit 150 may process the data acquired by the CT system 200 and the PET system 300 under control of an operator operating the control station 115.

Figure 2:
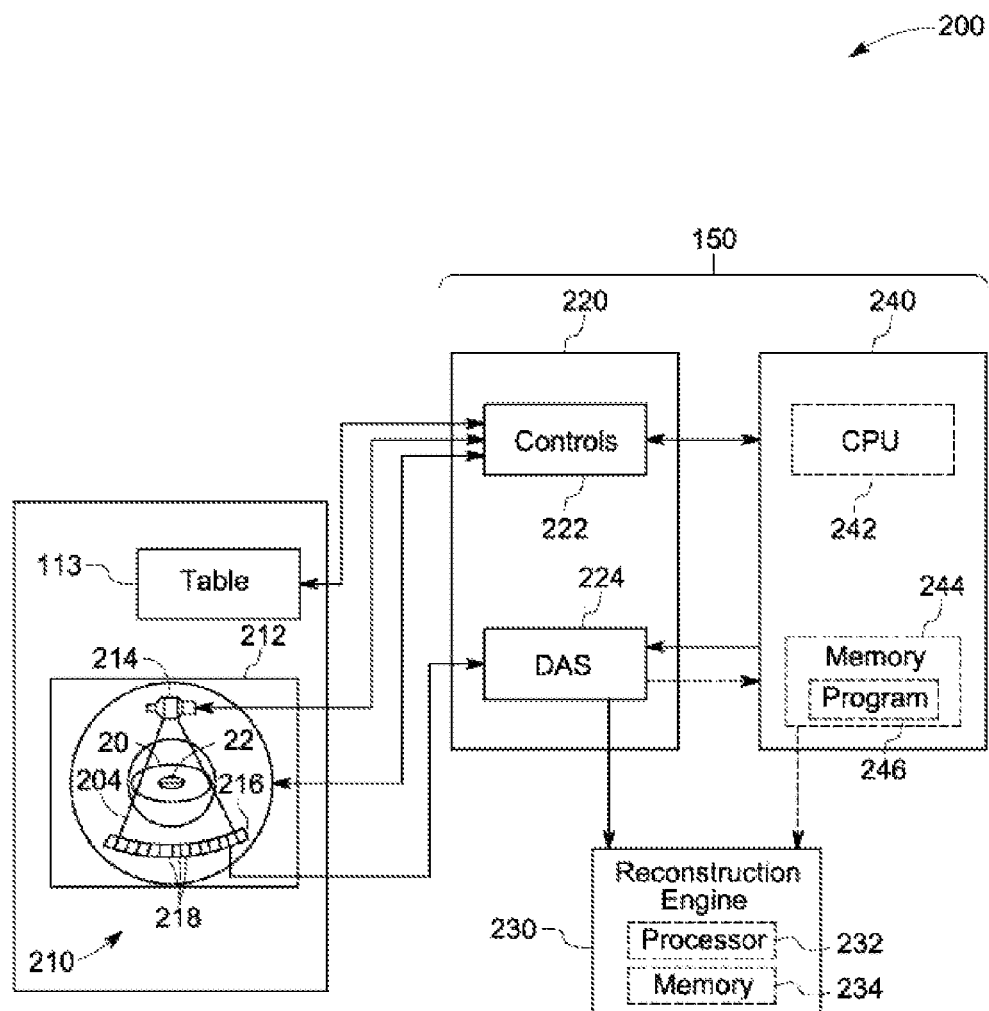
FIG. 2 illustrates an embodiment of CT system architecture.

FIG. 2 depicts major components of the CT system 200 of the PET-CT system 100 according to an exemplary embodiment of the present invention. The components of the CT system 200 may be housed both in the housing 120 and in the processing unit 150 shown in FIG. 1. The CT system 200 conducts X-ray tomographic imaging by illuminating a subject 20 with an x-ray beam 204 substantially transverse to an axis through the subject 20. The axis may generally be centered on an object 22 of interest, such as an organ or other tissue structure. The subject 20 may be located on the table bed 114 (as shown in FIG. 1) that translates along the direction of the axis, thereby enabling illumination of a volumetric portion of the subject 20 by the x-ray beam 204.

The CT system 200 may include a source-detector assembly, which in an exemplary embodiment may comprise a gantry 212 rotatable about the axis. An x-ray source 214, such as an x-ray tube, may be mounted on the gantry 212 and may rotate with rotation of the gantry 212. The x-ray source 214, which may comprise a collimating element (not shown), may project the beam 204 of x-rays toward a detector array 216 disposed opposite the source 214 relative to the gantry 212.

The detector array 216 may include numerous individual detector elements 218. Detector elements 218 may together provide information regarding the internal structures of the subject 20, such as the object 22. In one embodiment, each detector element 218 may generate an electrical signal indicating the intensity of a portion of the x-ray beam 204 impinging thereupon.

The signals from detector elements 218 may indicate a degree of attenuation of the beam 204 as the x-rays traverse the material or substance of the subject 20. In one embodiment, the source 214 may be rotated around the subject 20 to execute a scan operation whereby the CT system 200 acquires x-ray data. In another embodiment, the gantry 212, with source 214 attached to a side portion thereof, may rotate about the axis of the subject 20 to acquire x-ray data from numerous different illumination angles or "view angles."

The rotation operation for the source 214 may be controlled by a control/interface system 220. The control/interface system 220 may include a server computer residing in the processing unit 150 and the operator may interact with the control/interface system 220 by means of the control station 115 and/or other input devices. The control/interface system 220 may provide control for positioning of the gantry 212 relative to the subject 20, such as controlling speed of rotation about the axis and control of relative positions of the table 113 and the gantry 212. A controls section 222 may also provide control over x-ray generation (power and timing) of the source 214. The control/interface system 220 may also include a Data Acquisition System ("DAS") 224 that samples the detector signals generated from the detector elements 218 and converts the sampled signals into digital data for further processing.

A reconstruction engine 230 may also be housed in the processing unit 150 and may receive the sampled and digitized data (sometimes referred to as "projection data") from the DAS 224 and may perform image reconstruction to generate CT images. In one embodiment, the reconstruction engine 230 may include a separate processor 232 and/or memory 234. Various algorithms may be utilized for reconstructing a CT image from projection data comprising a plurality of projection views. Generally, the CT image may be generated in a format compatible with the Digital Imaging and Communications in Medicine "DICOM") standard. The DICOM standard specifies the network protocol by which two DICOM-compatible systems communicate.

In one embodiment, the reconstruction engine 230 may send the reconstructed CT image to, for example, a system management computer 240, which may also reside in the processing unit 150, for storage or further processing. The computer 240 may include a CPU (a processor) 242 and/or at least one memory 244.

Figure 3:
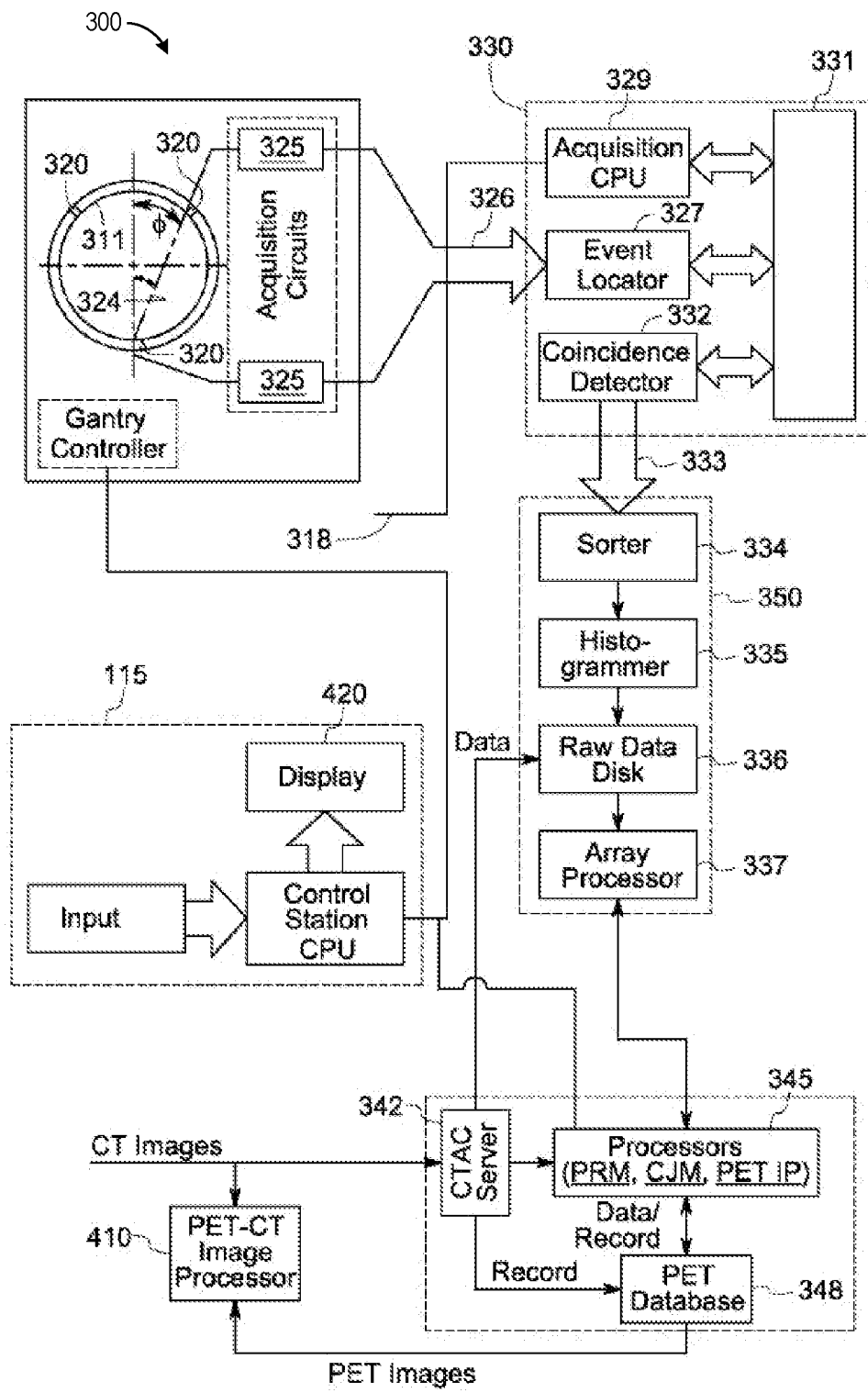
FIG. 3 illustrates an embodiment of PET system architecture.

FIG. 3 illustrates an embodiment of the PET system 300 of the PET-CT imaging system. The PET system 300 may include detector ring assembly 311 disposed about the patient bore. The detector ring assembly 311 may include multiple detector rings that are spaced along the central axis to form a cylindrical detector ring assembly. Each detector ring of the detector ring assembly 311 may be formed of detector modules 320. Each detector module 320 may include an array (e.g., a 6×6 array) of individual detector crystals that may be formed of bismuth germanate (BGO), for example. Other various detector crystals or materials may also be provided. The detector crystals may detect gamma rays emitted from the patient and in response produce photons. In one embodiment, the array of detector crystals may be positioned in front of four PhotoMultiplier Tubes ("PMTs"). The PMTs may produce analog signals when a scintillation event occurs at one of the detector crystals, e.g., when a gamma ray emitted from the patient is received by one of the detector crystals. Other photon detectors such as solid-state photomultipliers or avalanche photodiodes may be used in another embodiment. A set of acquisition circuits 325 may be mounted within the housing 120 (shown in FIG. 1) to receive these signals and produce digital signals indicating the event coordinates (e.g., the location of the detected gamma ray) and the total energy of the gamma ray. These may be sent through a cable 326 to an event locator circuit 327. In another embodiment, each acquisition circuit 325 may also produce an Event Detection Pulse ("EDP"), which indicates the time the scintillation event took place.

The event locator circuits 327 may form part of a data acquisition processor 330, which periodically samples the signals produced by the acquisition circuits 325. The processor 330 may have an acquisition CPU 329, which controls communications on the local area network 318 and a backplane bus 331. The event locator circuits 327 may assemble the information regarding each valid event into a set of digital numbers that indicate precisely when the event took place and the position of the detector crystal, which detected the event. This event data packet may be conveyed to a coincidence detector 332, which is also part of the data acquisition processor 330.

The coincidence detector 332 may accept the event data packets from the event locator circuits 327 and may determine whether any two of them are in coincidence. In this example, coincidence may be determined by a number of factors. First, the time markers in each event data packet may be required to be within a certain time period of each other, e.g., 12.5 nanoseconds. Second, the locations indicated by the two event data packets may be required to lie on a straight line which passes through the Field Of View ("FOV") in the patient bore. For a detailed description of the coincidence detector 332, reference is made to U.S. Pat. No. 5,241,181 entitled "Coincidence Detector For A PET Scanner," which is hereby incorporated by reference in its entirety. Coincidence event pairs may be located and recorded as a coincidence data packet that is conveyed through a link 333 to a storage subsystem 350. In the storage subsystem 350, a sorter 334 may use a lookup table to sort the coincidence events in a 3D projection plane format. For a detailed description of the sorter 334, reference is made to U.S. Pat. No. 5,272,343 entitled "Sorter For Coincidence timing Calibration In A PET Scanner," which is hereby incorporated by reference in its entirety.

The detected events may be stored in a dynamic histogram memory (histogrammer 335) where the events are ordered by radial positions and projection angles and other parameters. For example, in Time-of-Flight ("TOF") PET scanners, the difference in arrival time of the two photons may also be recorded. In addition, the information on the energy of the photons may also be used. The PET data for a particular frame may be written to a raw data disk 336. TOF PET imaging enables time-difference measurement, e.g., determines the amount of time between the recording of one event by one of the detectors and the recording of the other event by the other detector. Therefore, if an event occurs at the midpoint between these two detectors, the difference in time would be zero. If the event occurs closer to one detector, there will be a delay before the other detector sees it. Thus, TOF makes it possible for a point of origination of annihilation to be more accurately predicted, which leads to more accurate imaging. Ultimately, improved event localization reduces noise in image data, resulting in higher image quality, shorter imaging times, and lower dose to the patient.

The PET system 300, as shown in FIG. 3, may include one or more additional processors 345 such as, for example, a Prospective Reconstruction Manager ("PRM"), a Compute Job Manager ("CJM"), and a PET Image Processor ("PET IP"). The processors 345 may interact with an array processor 337 in the storage subsystem 350 to process the projection plane format PET data into attenuation corrected PET images.

The PET system 300 may also include a Computed Tomography Attenuation Correction ("CTAC") server 342. The CTAC server 342 may execute an independent process that runs in the processing unit 150. The CTAC process may receive CT image data from the CT system 200 and convert that CT image data into CTAC data. For example, the CTAC process may receive a request from the CT system and perform a bi-linear or other algorithm to convert the data from CT image units (HU) to a PET 511 keV attenuation coefficient ($cm^{-1}$), which produces the CTAC correction for PET data from the CT images. Once the CT images are converted to CTAC data, the CTAC server 342 may write the CTAC data to the raw data disk 336 in the storage subsystem 350. At the same time, a record may be transmitted to the PET database 348 to create a data link (CTAC record) to the CTAC data.

The PET system 300 may also include a PET-CT image processor 410 for receiving CT images and PET images. The CT images and the PET images may be spatially registered to each other because the patient undergoes both scans while remaining in the same position on the table bed 114. Registration may be achieved by detecting and estimating patient movement. The PET-CT image processor 410 generates a fused PET-CT image using the input CT and PET images.

It should be appreciated that the arrangement depicted in FIGS. 1 through 3 is exemplary. For instance, the PET-CT scanner 100 may include different configurations or number of processors, memories, and/or other hardware, to perform various additional functions, and these components may be located at other locations such as the control station 115, or at another server or processing unit. It should also be appreciated that the PET-CT system 100 may be further configured or customized to suit various scanning needs.

Figure 4:
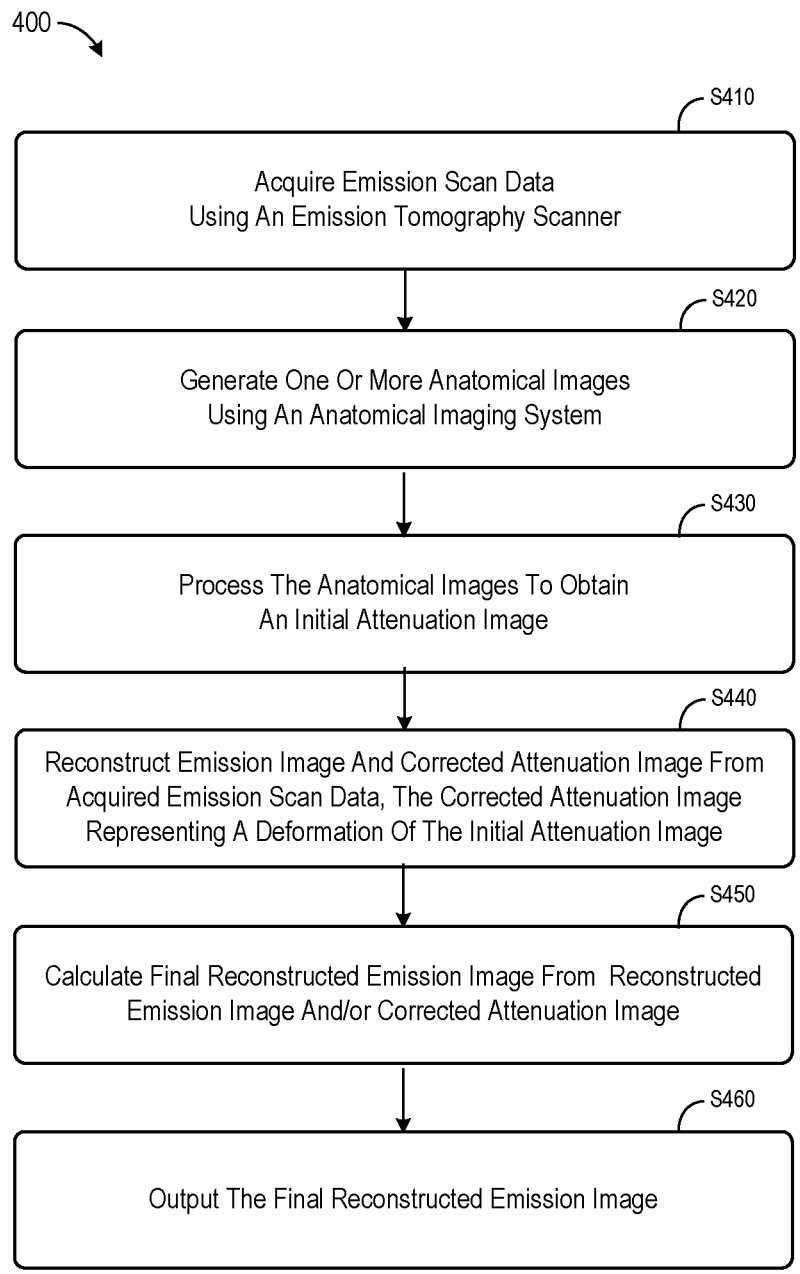
FIG. 4 is a flow chart of a method for correcting for a motion-induced attenuation mismatch in accordance with aspects disclosed herein.

FIG. 4 illustrates a flow chart of an embodiment of an imaging method 400 for correcting for a motion-induced mismatch in accordance with some embodiments of the present invention. The method 400 may provide attenuation mismatch correction in regions of interest and may be employed with a PET-CT system, such as described in reference to FIGS. 1 through 3. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, emission scan data may be acquired using an emission tomography scanner. Note that acquiring emission scan data might comprise acquiring PET emission scan data using a PET scanner or acquiring TOF PET emission scan data using a TOF PET scanner. According to other embodiments, emission scan data may be acquired by acquiring SPECT emission scan data using a SPECT scanner. According to some embodiments, the acquisition of emission scan data may involve respiratory gating and acquiring one or more gates of the respiratory gated emission scan data. According to other embodiments, the acquisition of emission scan data may be associated with cardiac gating and acquiring one or more gates of the cardiac gated emission scan data. Thus, the emission scan data may be respiratory and/or cardiac gated, and the method can be applied to each gate independently. Therefore, explicit gate dependence may be ignored here without loss of generality. Note that emission scan data may be acquired in sinogram format. Also note, however, that the method can also be applied to emission scan data acquired in list-mode format.

The emission scan data acquired at S410 may be associated with a statistical model. In particular, PET emission scan data $y_i$ may be modeled as independent Poisson random variables whose means are given by $$\bar{y}_i = e^{-l_i(\mu)} s_i(\lambda) + r_i \quad (1)$$

with $$l_i(\mu) = [G\mu]_i \quad (2)$$

$$s_i(\lambda) = [A\lambda]_i \quad (3)$$

for $i=1, \ldots, N_b$, where i denotes the sinogram bin index, $\mu=[\mu_1, \ldots, \mu_{N_v}]'$ and $\lambda=[\lambda_1, \ldots, \lambda_{N_v}]'$ denote column vectors representing an attenuation image and an emission image, respectively, ' denotes the matrix or vector transpose, $G \in \mathbb{R}^{N_b \times N_v}$ represents the geometric forward projector, $A \in \mathbb{R}^{N_b \times N_v}$ represents the system matrix including geometric forward projection, normalization and detector blurring, $r_i$ is the mean contribution of randoms and scatters, $N_b$ and $N_v$ are the number of sinogram bins and image voxels, respectively, and $[\bullet]_i$ denotes the ith element of a vector. Here the numbers of image voxels for attenuation and emission images are assumed to be the same without loss of generality. The $s_i$ terms represent the unattenuated projection of the emission image as if there were no attenuation, and the $e^{-l_i}$ terms represent the survival probabilities for attenuation. Here, $r_i$ includes scatter estimates, which may be estimated using an initially given attenuation image or furthermore may be iteratively updating using corrected attenuation images obtained by the methods described herein. Alternatively, the PET scan data may be modeled as independent Gaussian random variables.

At S420, one or more anatomical images may be generated using an anatomical imaging system. The step may be associated with, for example, generating one or more X-ray CT images from a helical CT scan, a cone beam CT scan, a step-and-shoot CT scan, or a cine CT scan with breath-hold or free breathing using an X-ray CT system and/or generating one or more Magnetic Resonance Imaging ("MRI") images, which may include a proton density weighted MRI image, a T1-weighted MRI image, a T2-weighted MRI image, a T2*-weighted MRI image, MRI images obtained using the Dixon's method, or an MRI image acquired using ultra-short or zero echo time radio frequency sequences, using an MRI system. According to some embodiments, the generation of the one or more anatomical images may involve respiratory gating and providing one or more gates of the respiratory gated anatomical images. For example, an X-ray CT image may be acquired using quiescent period respiratory gating. According to other embodiments, the generation of the one or more anatomical images may be associated with cardiac gating and providing one or more gates of the cardiac gated anatomical images. According to alternative embodiments, the generation of the one or more anatomical images may involve dual cardiac-respiratory gating and providing one or more gates of the dual cardiac-respiratory gated anatomical images. The one or more anatomical image generated in S420 and the emission scan in S410 may be mismatched due to patient motion such as respiratory and/or cardiac motion, or due to respiratory and/or cardiac phase mismatches.

At S430, the anatomical images may be processed to obtain an initial attenuation image. The processing of the anatomical images to obtain the initial attenuation image may involve segmenting the anatomical images and assigning a pre-determined attenuation coefficient to each segmented region, organ or tissue. The processing of the anatomical might also be associated with an application of a bilinear or trilinear transformation to an X-ray CT image to convert CT image units (HU) to a 511 keV PET attenuation coefficient (cm$^{-1}$), and/or an application of atlas-based, machine-learning, and/or pattern-recognition methods to one or more MRI images.

At S440, an emission image and a corrected attenuation image may be automatically reconstructed from the acquired emission scan data. The corrected attenuation image may represent, according to some embodiments, a deformation of the initial attenuation image. At S450, a final reconstructed emission image may be calculated based on the reconstructed emission image and/or the corrected attenuation image.

Suppose $\mu^0 = [\mu_1^0, \ldots, \mu_{N_v}^0]'$ denotes an initial attenuation image, which is obtained from an anatomical image such as x-ray CT or MRI images. In the initial attenuation image there may exist a respiratory and/or cardiac motion induced mismatch between the emission scan and the anatomical imaging scan. Such a mismatch may produce artifacts in reconstructed emission images.

A corrected attenuation image $\mu$ where the mismatch is corrected for may be modeled as a deformation of the initial attenuation image. To facilitate interpolation, continuous functions $\tilde{\mu}: \mathbb{R}^3 \mapsto \mathbb{R}$ and $\tilde{\mu}^0: \mathbb{R}^3 \mapsto \mathbb{R}$ may be introduced, whose discrete-space samples are $\mu$ and $\mu^0$, respectively. That is, $$\mu_j = \tilde{\mu}(x^j) \quad (4)$$

$$\mu_j^0 = \tilde{\mu}^0(x^j) \quad (5)$$

where $x^j = (x_1^j, x_2^j, x_3^j)$ denotes the Cartesian coordinate of voxel j in the 3D Euclidean space for $j=1, \ldots, N_v$.

The continuous-space version of the initial attenuation image $\tilde{\mu}^0$ may be modeled as a linear combination of basis functions $v_l: \mathbb{R}^3 \mapsto \mathbb{R}$, that is, $$\tilde{\mu}^0(x) = \Sigma N_{l=1}^{N_{vu}} v_l(x) \quad (6)$$

for $x \in \mathbb{R}^3$ where $u_l$ are linear coefficients. For example, the tensor product of cubic B-splines may be used for $v_l$, that is, $$v_l(x_1, x_2, x_3) = \beta_3(x_1 - x_1^l)\beta_3(x_2 - x_2^l)\beta_3(x_3 - x_3^l) \quad (7)$$

for $l = 1, \ldots, N_v$ where $$\beta_3(t) = \begin{cases} \frac{|t|^3}{2} - |t|^2 + \frac{2}{3}, & 0 \le |t| \le 1 \\ -\frac{(|t|-2)^3}{6}, & 1 \le |t| \le 2 \\ 0, & |t| \ge 2 \end{cases} \quad (8)$$

Given $\mu^0$, to calculate $u = [u_1, \ldots, u_{N_v}]'$, the equation $$\mu_j^0 = \Sigma N_{l=1}^{N_{vu}} v_l(x^j), \quad (9)$$

for $j=1, \ldots, N_v$, may be solved by deconvolution in the Fourier space.

The continuous-space version of the corrected attenuation image $\tilde{\mu}$ may be modeled as a deformation of $\tilde{\mu}^0$ using the following form:

$$\tilde{\mu}(x) = \tilde{\mu}^0(x_1 + \tilde{d}_1(x), x_2 + \tilde{d}_2(x), x_3 + \tilde{d}_3(x)) \quad (10)$$

for $x = (x_1, x_2, x_3) \in \mathbb{R}^3$ where $(\tilde{d}_1, \tilde{d}_2, \tilde{d}_3)$: $\mathbb{R}^3 \mapsto \mathbb{R}^3$ represents a deformation field or a displacement field. Note that embodiments described herein may apply to cases where the deformation is not only a re-interpolation but also takes density changes into account (e.g., by adding a multiplicative term to equation 10). The deformation field may be modeled as a linear combination of basis functions:

$$\tilde{d}_q(x) = \Sigma_{k=1}^{N_p} \theta_k^q \tilde{b}_k(x) \quad (11)$$

for $q=1, 2, 3$ where $\tilde{b}_k$ are basis functions, $\theta_k^q$ are linear coefficients, and $N_p$ is the number of the basis functions. Here, for $\tilde{b}_k$, the tensor product of cubic B-splines may be used as $$\tilde{b}_k(x_1, x_2, x_3) = \beta_3\left(\frac{x_1 - t_1^k}{\Delta}\right) \beta_3\left(\frac{x_2 - t_2^k}{\Delta}\right) \beta_3\left(\frac{x_3 - t_3^k}{\Delta}\right) \quad (12)$$

where $(t_1^k, t_2^k, t_3^k)$ represents the Cartesian coordinates of the control nodes and $\Delta$ is the node spacing. Alternative basis functions such as DCT (discrete cosine transform) basis functions or polynomial functions may be used for $\tilde{b}_k$. Let $d_j^q$ be discrete-space samples of $\tilde{d}_q$ such that $$d_j^q = \tilde{d}_q(x^j) = \Sigma_{k=1}^{N_p} \theta_k^q \tilde{b}_k(x^j) = [B\theta^q]_j \quad (13)$$

for $q=1, 2, 3$ and $j=1, \ldots, N_v$, where $[B]_{jk} = \tilde{b}_k(x^j)$, $\theta^q = [\theta_1^q, \ldots, \theta_{N_p}^q]'$, and $[\bullet]_{jk}$ denotes the $(j, k)$th element of a matrix.

Combining (4), (6), (7), (10) and (11) yields $$\mu_j = \Sigma_{l=1}^{N_{vu}} \Pi_{q=1}^3 \beta_3(x_q^j + x_q^l + \Sigma_{k=1}^{N_p \tilde{b}} \tilde{b}_k(x^j)\theta_k^q). \quad (14)$$

This can be rewritten as $$\mu(\theta) = W_{\beta_3\beta_3\beta_3}(\theta)u \quad (15)$$

where $\theta = [\theta^1, \theta^2, \theta^3]'$ and the $N_v$ by $N_v$ matrix $W$ is defined as $$[W_{fgh}]_{ji} = f(x_1^j - x_1^i + d_j^1)g(x_2^j - x_2^i + d_j^2)h(x_3^j - x_3^i + d_j^3) \quad (16)$$

for functions $f: \mathbb{R} \mapsto \mathbb{R}$, $g: \mathbb{R} \mapsto \mathbb{R}$ and $h: \mathbb{R} \mapsto \mathbb{R}$ with $d_j^q$ being given in (13). From (5)-(7), it can be seen that $$\mu^0 = W_{\beta_3\beta_3\beta_3}(0)u \quad (17)$$

where $0 = [0, \ldots, 0]' \in \mathbb{R}^{3N_p}$. Therefore, (15) can be rewritten as $$\mu(\theta) = W_{\beta_3\beta_3\beta_3}(\theta)(W_{\beta_3\beta_3\beta_3}(0))^{-1}\mu^0. \quad (18)$$

The above equation represents the corrected attenuation image $\mu$ as a deformation of the initial attenuation image $\mu^0$ where the deformation is parameterized by the deformation parameters $\theta$.

With respect to the reconstruction of the corrected attenuation image and the emission image, the goal is to estimate, from the PET emission scan data $y_i$, the emission image $\lambda$ and the deformation parameters $\theta$, which parameterize the corrected attenuation image $\mu$ as a deformation of the initial attenuation image $\mu^0$, as given in (18). The emission image $\lambda$ and the deformation parameters $\theta$ may be calculated by minimizing a cost function $\Phi$:

$$(\hat{\lambda}, \hat{\theta}) = \arg\min_{\lambda \ge 0, \theta} \Phi(\lambda, \theta) \quad (19)$$

$$\Phi(\lambda, \theta) = L(\lambda, \theta) + R(\lambda, \theta) \quad (20)$$

where L is the negative Poisson log-likelihood, $$L(\lambda, \theta) = \Sigma_{i=1}^{N_b} -y_i \log(e^{-l_i(\mu(\theta))}s_i(\lambda) + r_i) + (e^{-l_i(\mu(\theta))}s_i(\lambda) + r_i) \quad (21)$$

and R is the regularization function or the regularizing penalty function. Instead of the negative Poisson log-likelihood, least squares or weighted least squares may be alternatively used. If the log-likelihood is solely used without any regularization function, the calculation in (19) amounts to maximum likelihood estimation. If the regularization function is used, the calculation in (19) is called penalized likelihood estimation or Maximum A Posteriori ("MAP") estimation. An example of the regularization function is the quadratic penalty, which encourages smoothness in the emission image and the deformation field:

$$R(\lambda, \theta) = \gamma_\lambda \sum_{j=1}^{N_v} \sum_{k \in \mathcal{N}_j^\lambda} \frac{w_{jk}^\lambda (\lambda_j - \lambda_k)^2}{2} + \gamma_\theta \sum_{j=1}^{N_p} \sum_{k \in \mathcal{N}_j^\theta} \frac{w_{jk}^\theta (\theta_j - \theta_k)^2}{2} \quad (22)$$

where $y_\lambda$ and $y_\theta$ are regularization parameters, $\mathcal{N}_j^\lambda$ and $\mathcal{N}_{j'}^\theta$ denote a set of neighbors for voxel j and basis function j', respectively, and $w_{jk}^\lambda$ and $w_{jk}^\theta$ are pre-determined non-negative weights. Alternatively, nonquadratic penalties or other types of penalties such as Relative Difference Prior ("RDP") may be used for the regularization function.

Any numerical optimization algorithm may be used to calculate the emission image $\lambda$ and the deformation parameters $\theta$ by minimizing the cost function $\Phi$ in (19). For example, an alternating update approach may be used where the emission image $\lambda$ and the deformation parameters $\theta$ are alternatively updated:

$$\hat{\lambda}^{n+1} = \arg\min_{\lambda \ge 0} \Phi(\lambda, \theta^n) \quad (23)$$

$$\hat{\theta}^{n+1} = \arg\min_\theta \Phi(\hat{\lambda}^{n+1}, \theta) \quad (24)$$

for $n = 0, 1, \ldots$ where n denotes the iteration index. For initialization, $\hat{\theta}^0 = 0$ may be used. In (23) and (24), accurate minimization is not necessary but a sufficient decrease in the cost function is enough. Iterating between (23) and (24) may be terminated if a certain criterion is satisfied, for example, a pre-determined iteration number is reached, the difference between the previous and the current iterates is smaller than a certain threshold, or the gradient of the cost function is smaller in norm than a certain threshold.

For the update of the emission image in (23), any algorithm for emission image reconstruction may be used including gradient based methods, De Pierro's modified EM, Separable Paraboloidal Surrogate ("SPS"), preconditioned conjugate gradient, and Block Sequential Regularized Expectation Maximization ("BSREM").

For the update of the deformation parameters in (24), gradient based algorithms may be used utilizing the gradient of the cost function with respect to the deformation parameters:

$\nabla_\theta \Phi(\lambda,\theta) = \nabla_\theta L(\lambda,\theta) + \nabla_\theta R(\lambda,\theta)$. The gradient of the negative log-likelihood with respect to the deformation parameters can be calculated as $$\nabla_\theta L(\lambda,\theta) = [\nabla_{\theta^1} L(\lambda,\theta), \nabla_{\theta^2} L(\lambda,\theta), \nabla_{\theta^3} L(\lambda,\theta)]' \qquad (25)$$

with $$\nabla_{\theta^1} L(\lambda,\theta) = B' \text{diag}\{W_{\dot\beta_3 \beta_3 \beta_3}(\theta) u\} \nabla_\mu L(\lambda,\mu) \qquad (26)$$

$$\nabla_{\theta^2} L(\lambda,\theta) = B' \text{diag}\{W_{\beta_3 \dot\beta_3 \beta_3}(\theta) u\} \nabla_\mu L(\lambda,\mu) \qquad (27)$$

$$\nabla_{\theta^3} L(\lambda,\theta) = B' \text{diag}\{W_{\beta_3 \beta_3 \dot\beta_3}(\theta) u\} \nabla_\mu L(\lambda,\mu) \qquad (28)$$

where $\text{diag}\{\bullet\}$ denotes a diagonal matrix, $$\dot\beta_3 = \begin{cases} \left(\frac{3|t|^3 - 4|t|}{2}\right) \text{sgn}(t), & 0 \le |t| \le 1 \\ -\frac{(|t|-2)^2}{2} \text{sgn}(t), & 1 \le |t| \le 2 \\ 0, & |t| \ge 2 \end{cases}, \qquad (29)$$

and $\nabla_\mu L$ denotes the gradient of L with respect to $\mu$ given by $$\nabla_\mu L(\lambda,\mu) = G' \left[ \begin{array}{c} \vdots \\ \left(\frac{y_i}{\bar y_i} - 1\right) e^{-l_i(\mu)} s_i(\lambda) \\ \vdots \end{array} \right]. \qquad (30)$$

On terminating the updates in (23) and (24) at iteration N, the emission image iterate $\hat\lambda^N$ may be used as a final reconstructed emission image, or the corrected attenuation image $\mu(\hat\theta^N) = W_{\beta_3 \beta_3 \beta_3}(\hat\theta^N)(W_{\beta_3 \beta_3 \beta_3}(0))^{-1} \mu^0$ may be used for reconstructing a final emission image, for example, by Ordered Subsets Expectation Maximization ("OSEM") algorithm or penalized-likelihood through BSREM, conjugate gradient or SPS.

At S460, the final reconstructed emission image is output. The final reconstructed emission may be "output," for example, by storing the final reconstructed emission image in a data storage system and/or displaying the final reconstructed emission image on a display system.

Thus, according to some embodiments, the respiratory phase mismatch between a CT-based attenuation image and a respiratory gated PET emission data set may be corrected for by jointly estimating the mismatch and PET emission images. Specifically, an attenuation image for each respiratory gate may be modeled as a deformation of a given CT-based attenuation image and the deformation and a PET emission image are jointly estimated from each gate of the respiratory gated PET emission data. The output of this method is the corrected attenuation image and the emission image for each respiratory gate, which best explain the gated emission data. The reconstructed emission images may be used to generate a respiratory motion free image by the RRA procedure.

Alternatively, the corrected attenuation image may be subsequently used for each gate for reconstructing a PET emission image with different reconstruction parameters including smoothing parameters and iteration numbers. In addition, some embodiments may help solve a problem introduced when different slices of a given CT-based attenuation image correspond to different respiratory phases, by deforming the given attenuation image so that the measured sinogram data are best explained. Some embodiments may also be applied to a more complicated procedure to generate a motion free emission image where the emission images and their deformation parameters are simultaneously estimated from the entire gates of the gated data set. Note that a joint estimation technique with a CT-based attenuation image may be used in order to address a respiratory phase mismatch between the CT-based attenuation image and respiratory gated PET data.

Figure 5:
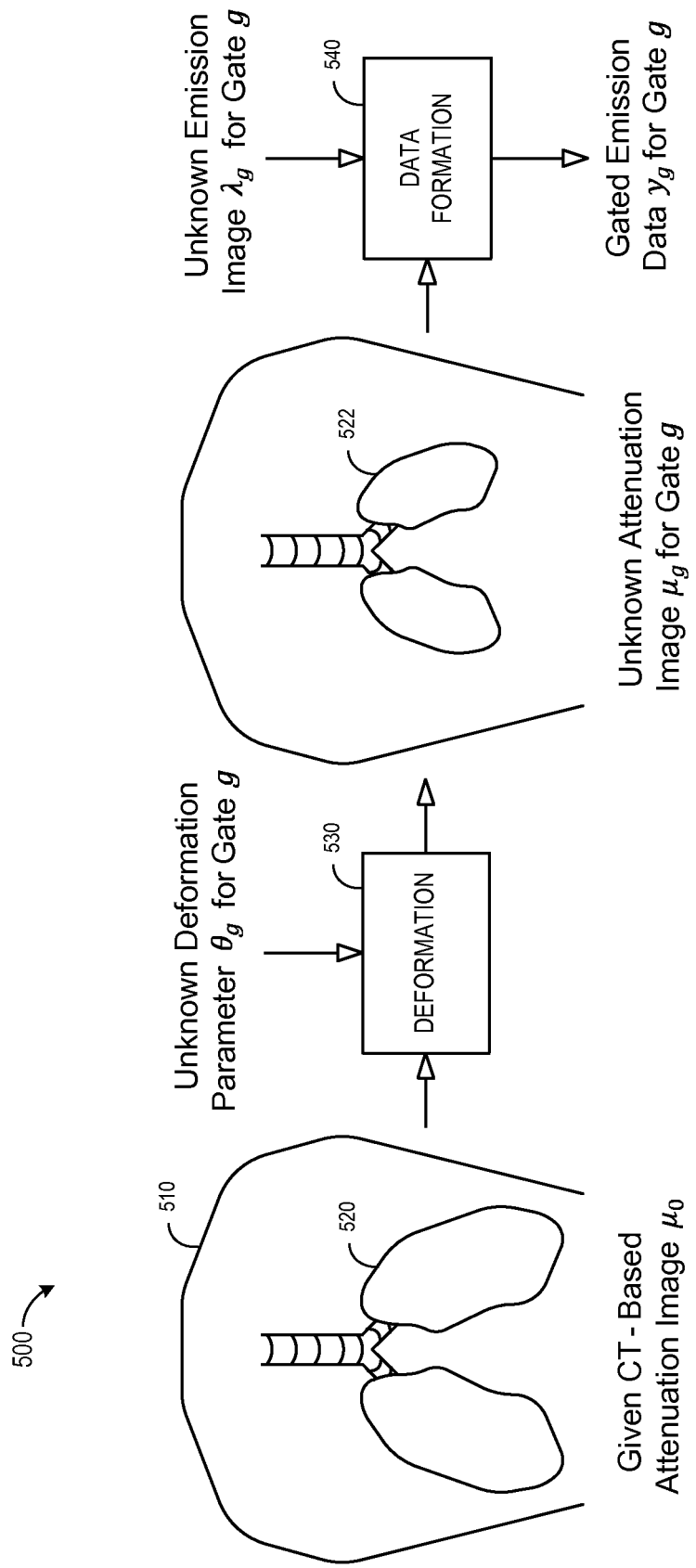
FIG. 5 represents a data model in accordance with some embodiments.

According to some embodiments, when a CT-based attenuation image and respiratory gated PET emission data are given, a respiratory phase mismatch between the CT-based attenuation image and the gated PET data may be reduced. The CT-based attenuation image, which may be obtained from a CT image usually taken with breath-holding, contains a respiratory motion induced mismatch. According to some embodiments, a respiratory phase matched attenuation image for each gate is modeled as a deformation of the given CT-based attenuation image. For example, FIG. 5 represents a data model 500 in accordance with some embodiments. In particular, in a patient's body 510 a first state of the lungs 520 may be associated with a given CT-based attenuation image $\mu_0$. A deformation element 530 may be associated with an unknown deformation parameter $\theta_g$ for gate g. Moreover, a patient's second state of the lungs 522 may be associated with an unknown corrected attenuation image $\mu_g$ for gate g. A data formation element 540 may be associated with an unknown emission image $\lambda_g$ for gate g and generate gated emission data $y_g$ for gate g. The deformation can be modeled using basis functions such as B-splines, whose coefficients are deformation parameters to be estimated. For each gate, measured PET emission data may be modeled as an attenuated forward projection (analogous to the attenuated Radon transform) of an unknown gate-dependent PET emission image where attenuation factors involve a deformation of the CT-based attenuation image. In other words, the gated PET data set for each gate g may represent a function of the unknown gate-dependent PET emission image and also the deformation parameters, which represent a deformation of the given CT-based attenuation image.

Figure 6:
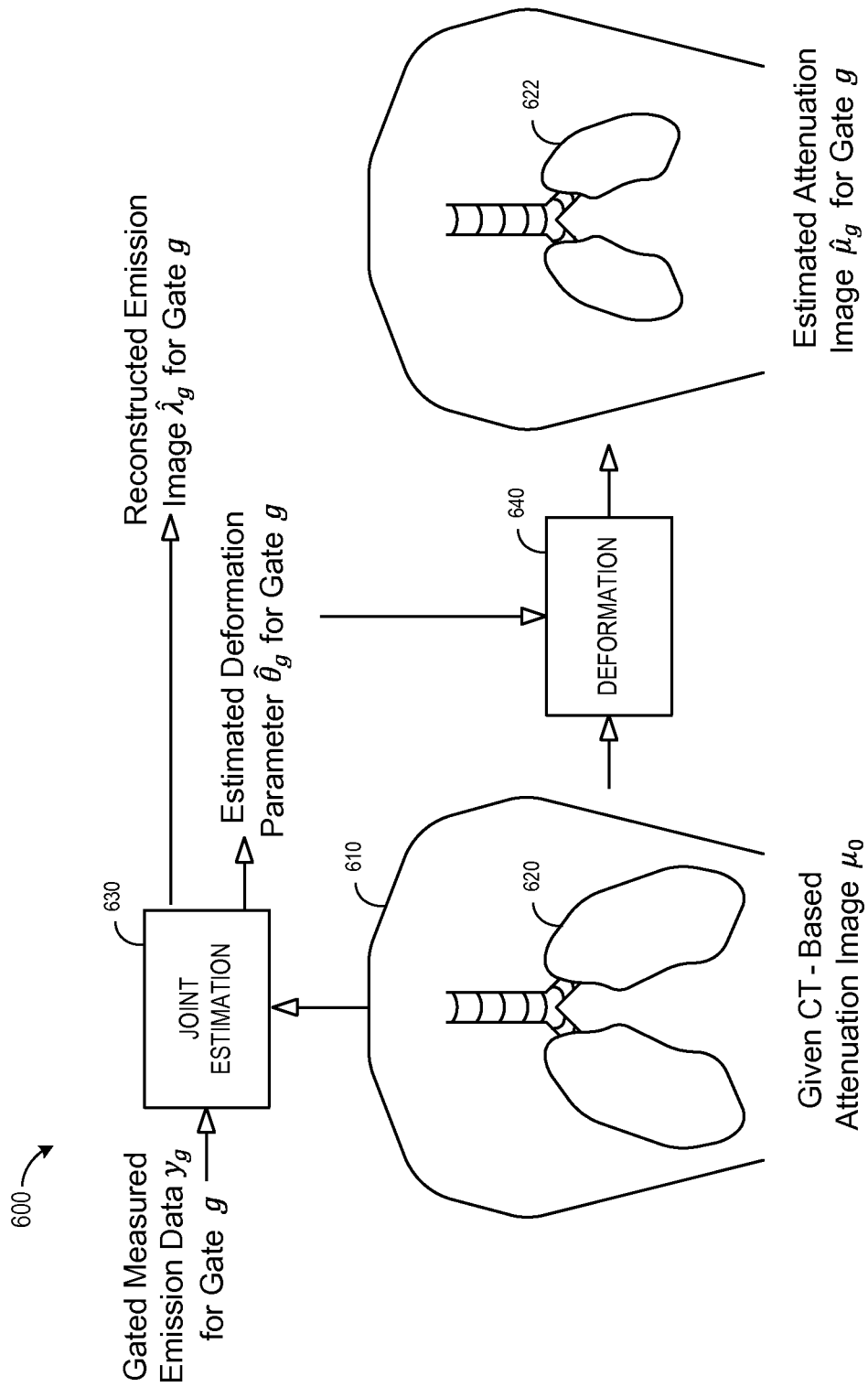
FIG. 6 illustrates a joint estimation approach that might be implemented according to some embodiments.

The gate-dependent PET emission image and deformation parameters can be jointly estimated from the corresponding gated PET data. For example, FIG. 6 illustrates a joint estimation approach 600 that might be implemented according to some embodiments. In particular, gated measured emission data $y_g$ for gate g may be provided to a joint estimation element 630 along with given CT-based attenuation image $\mu_0$ for a patient's body 610 and the first state of the lungs 620. The joint estimation element 630 may output a reconstructed emission image $\hat\lambda_g$ for gate g along with estimated deformation parameters $\hat\theta_g$ for gate g. Moreover, the estimated deformation parameters $\hat\theta g$ for gate g may be used as input to a deformation element 640 which may generate an estimated corrected attenuation image $\hat\mu_g$ for gate g. Thus, from the estimated deformation parameters, the corresponding attenuation image for each gate can be obtained by warping the CT-based attenuation image accordingly. For each gate g, the deformation parameters and the emission image can be jointly estimated by a Penalized Likelihood ("PL") estimation that calculates an emission image $\hat\lambda_g$ and deformation parameters $\hat\theta_g$ for gate g by maximizing a PL objective function as previously described.

According to some embodiments, the deformation parameters and the respiratory motion free emission image are jointly estimated in connection with an objective function:

$$\Phi = \sum_g L^{(g)}(\lambda^{(g)}, \mu^{(g)}) + D_1(\lambda^{(g)}, W(\theta^{(g)})\lambda) + D_2(\mu^{(g)}, W(\theta^{(g)})\mu_0) + R$$

where $\lambda^{(g)}$ is an emission image for gate g, which is modeled as a deformation of a respiratory motion free emission image $\lambda$, $W(\theta^{(g)})$ is a warping matrix representing the deformation for gate g, which is parameterized by deformation parameter $\theta^{(g)}$, $\mu^{(g)}$ is an attenuation image for gate g, which is modeled as a deformation of the given CT-based attenuation image $\mu_0$, $D_1$ and $D_2$ are dissimilarity or distance functions, R is a regularization function, and $L^{(g)}$ is the negative Poisson log-likelihood given by $L^{(g)}(\lambda^{(g)},\mu^{(g)}) = \Sigma_i -y_i^{(g)} \log(e^{-[G\mu^{(g)}]_i}[A\lambda^{(g)}]_i + r_i) + (e^{-[G\mu^{(g)}]_i}[A\lambda^{(g)}]_i + r_i)$.

Here, $y_i^{(g)}$ represents gated measured PET emission data for sinogram bin i and gate g, G denotes a forward projection matrix representing line-integration, A denotes a forward projection operator including geometric projection and normalization, and $r_i$ represents the mean background contribution of scatters and randoms. The above objective function can be minimized with respect to $\lambda^{(g)}$, $\mu^{(g)}$, $\theta^{(g)}$ and $\lambda$, for example, by alternative minimization, in order to calculate the gate-dependent respiratory-phase matched attenuation image $\mu^{(g)}$ with the respiratory motion free emission image $\lambda$.

Figure 7:
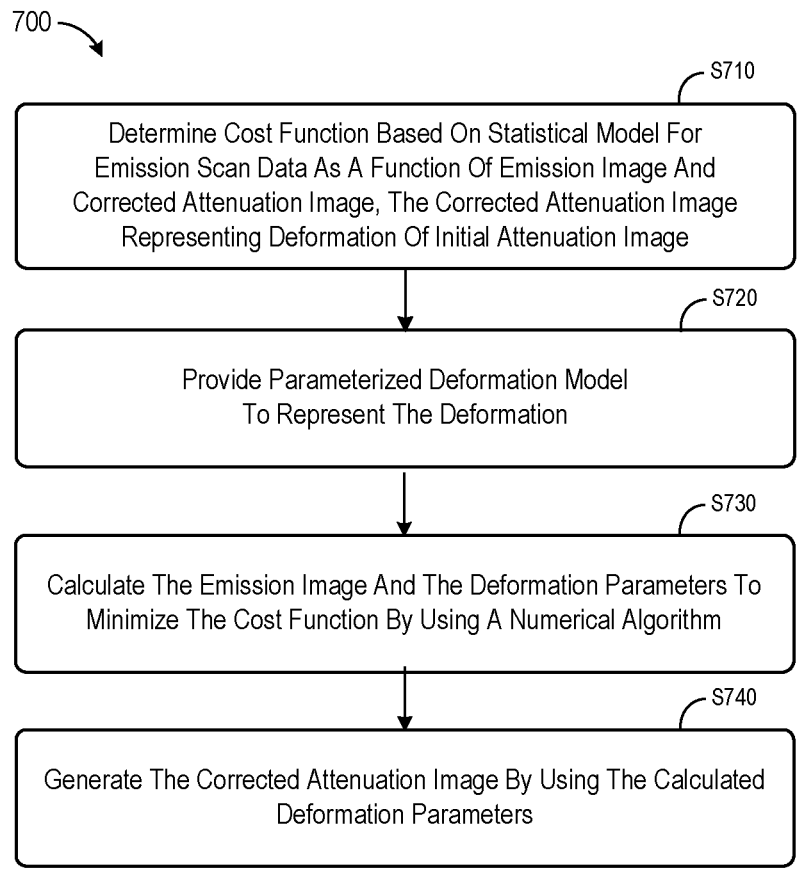
FIG. 7 is a flow chart of a method utilizing a cost function and a parameterized deformation model in accordance with aspects disclosed herein.

FIG. 7 is a flow chart of a method 700 utilizing a cost function and a parameterized deformation model in accordance with aspects disclosed herein. At S710, a cost function may be determined based on a statistical model for emission scan data as a function of an emission image and a corrected attenuation image, the corrected attenuation image representing a deformation of the initial attenuation image. Note that the cost function might include, for example, a log-likelihood term, a weighted least squares term, and/or a regularizing penalty term.

At S720, a deformation model that is parameterized by deformation parameters may be provided to represent the deformation of the initial attenuation image. The parameterized deformation model may include, according to some embodiments, a linear combination of deformation basis functions to represent a deformation field or a displacement field with linear coefficients representing deformation parameters. Moreover, the deformation basis functions might include B-splines, Discrete Cosine Transform ("DCT") basis functions, and/or polynomial functions.

At S730, the emission image and the deformation parameters may be calculated to minimize the cost function by using a numerical algorithm. Note that calculating the emission image and the deformation parameters might include generating intermediate emission images and deformation parameters by iteratively applying a numerical optimization algorithm until a pre-determined criterion is satisfied. Moreover, the numerical optimization algorithm may include alternative minimization algorithms and/or gradient based algorithms. According to some embodiments, the pre-determined criterion includes a pre-determined number of iterations, a criterion on the gradient of the cost function, a criterion on the decrease of the cost function value, or a criterion on the difference of previous and current intermediate emission images and/or intermediate deformation parameters. At S740, the corrected attenuation image may be generated by using these calculated deformation parameters.

Thus, respiratory gated data may be used to generate an improved PET image for accurate PET quantitation, for example, by an RRA procedure with the motion induced mismatch corrected attenuation images. While specific references have been made to an X-ray CT imaging system and PET system, it should be appreciated that embodiments described herein are not intended to be limited to these or to any specific type of imaging system or modality. In general, the embodiments described herein may be used for providing local motion correction for other tomography imaging combinations such as, for example, CT-SPECT and CT-MRI.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for reconstructing a nuclear medicine image, comprising:
   acquiring emission scan data using an emission tomography scanner;
   generating one or more anatomical images using an anatomical imaging system;
   processing the anatomical images to obtain an initial attenuation image;
   automatically reconstructing, by a processor, an emission image and a corrected attenuation image from the acquired emission scan data, the corrected attenuation image representing a deformation of the initial attenuation image, wherein automatically reconstructing the emission image and the corrected attenuation image from the acquired emission scan data comprises:
      determining a cost function based on a statistical model for emission scan data as a function of an emission image and a corrected attenuation image, the corrected attenuation image representing a deformation of the initial attenuation image,
      providing a deformation model that is parameterized by deformation parameters to represent the deformation of the initial attenuation image,
      calculating the emission image and the deformation parameters to minimize the cost function by using a numerical algorithm, and
      generating the corrected attenuation image by using the calculated deformation parameters;
   calculating a final reconstructed emission image based on at least one of: (i) the automatically reconstructed emission image, and (ii) the corrected attenuation image; and
   outputting the final reconstructed emission image by performing at least one of: (i) storing the final reconstructed emission image in a data storage system, or (ii) displaying the final reconstructed emission image on a display system.

2. The method of claim 1, wherein acquiring emission scan data comprises at least one of: (i) acquiring Positron Emission Tomography ("PET") emission scan data using a PET scanner, (ii) acquiring Time-Of-Flight ("TOF") PET emission scan data using a TOF PET scanner, and (iii) acquiring Single Photon Emission Computed Tomography ("SPECT") emission scan data using a SPECT scanner.

3. The method of claim 1, wherein acquiring emission scan data comprises at least one of: (i) respiratory gating and acquiring one or more gates of the respiratory gated emission scan data, (ii) cardiac gating and acquiring one or more gates of the cardiac gated emission scan data, and (iii) dual cardiac-respiratory gating and acquiring one or more gates of the dual cardiac-respiratory gated emission scan data.

4. The method of claim 1, wherein generating one or more anatomical images comprises at least one of: (i) generating one or more x-ray Computed Tomography ("CT") images using an x-ray CT system, and (ii) generating one or more Magnetic Resonance Imaging ("MRI") images using an MRI system.

5. The method of claim 1, wherein generating one or more anatomical images comprises at least one of: (i) respiratory gating and providing one or more gates of the respiratory gated anatomical images, (ii) cardiac gating and providing one or more gates of the cardiac gated anatomical images, and (iii) dual cardiac-respiratory gating and providing one or more gates of the dual cardiac-respiratory gated anatomical images.

6. The method of claim 1, wherein processing the anatomical images to obtain the initial attenuation image comprises at least one of: (i) segmenting the anatomical images and assigning a pre-determined attenuation coefficient to each segmented region, organ or tissue, (ii) applying a bilinear or trilinear transformation to an x-ray CT image, and (iii) applying atlas-based, machine-learning and/or pattern-recognition methods to one or more MRI images.

7. The method of claim 1, wherein the cost function includes at least one of: (i) a log-likelihood term, (ii) a weighted least squares term, and (iii) a regularizing penalty term.

8. The method of claim 1, wherein the deformation model includes a linear combination of basis functions to represent a deformation field with linear coefficients representing deformation parameters.

9. The method of claim 8, wherein the basis functions include B-splines, Discrete Cosine Transform ("DCT") basis functions, or polynomial functions.

10. The method of claim 1, wherein calculating the emission image and the deformation parameters comprises generating intermediate emission images and deformation parameters by iteratively applying a numerical optimization algorithm until a pre-determined criterion is satisfied.

11. The method of claim 10, wherein the numerical optimization algorithm includes alternative minimization algorithms, gradient based algorithms, conjugate gradient algorithms, coordinate descent algorithms, minorize-minimize algorithms, Levenberg-Marquardt algorithms, Newton's methods, Gauss-Newton algorithms, or ordered subsets algorithms.

12. The method of claim 10, wherein the pre-determined criterion includes the pre-determined number of iterations, a criterion on the gradient of the cost function, a criterion on the decrease of the cost function value, or a criterion on the difference of previous and current intermediate emission images and/or intermediate deformation parameters.

13. The method of claim 1, wherein calculating the final reconstructed emission image comprises taking the automatically reconstructed emission image or reconstructing an emission image from the acquired emission scan data utilizing the corrected attenuation image.

14. A non-transitory, computer-readable medium storing instructions that, when executed by a computer processor, cause the computer processor to perform a method associated with reconstructing a nuclear medicine image, the method comprising:

acquiring emission scan data using an emission tomography scanner;
generating one or more anatomical images using an anatomical imaging system;
processing the anatomical images to obtain an initial attenuation image;
automatically reconstructing, by a processor, an emission image and a corrected attenuation image from the acquired emission scan data, the corrected attenuation image representing a deformation of the initial attenuation image, wherein automatically reconstructing the emission image and the corrected attenuation image from the acquired emission scan data comprises:
   determining a cost function based on a statistical model for emission scan data as a function of an emission image and a corrected attenuation image, the corrected attenuation image representing a deformation of the initial attenuation image,
   providing a deformation model that is parameterized by deformation parameters to represent the deformation of the initial attenuation image,
   calculating the emission image and the deformation parameters to minimize the cost function by using a numerical algorithm, and
   generating the corrected attenuation image by using the calculated deformation parameters;
calculating a final reconstructed emission image based on at least one of: (i) the automatically reconstructed emission image, and (ii) the corrected attenuation image; and
outputting the final reconstructed emission image by performing at least one of: (i) storing the final reconstructed emission image in a data storage system, or (ii) displaying the final reconstructed emission image on a display system.

15. The medium of claim 14, wherein acquiring emission scan data comprises at least one of: (i) acquiring Positron Emission Tomography ("PET") emission scan data using a PET scanner, (ii) acquiring Time-Of-Flight ("TOF") PET emission scan data using a TOF PET scanner, and (iii) acquiring Single Photon Emission Computed Tomography ("SPECT") emission scan data using a SPECT scanner.

16. The medium of claim 14, wherein generating one or more anatomical images comprises at least one of: (i) generating one or more x-ray Computed Tomography ("CT") images using an x-ray CT system, and (ii) generating one or more Magnetic Resonance Imaging ("MRI") images using an MRI system.

17. A system associated with reconstructing a nuclear medicine image, comprising:
an emission tomography scanner to acquire emission scan data;
an anatomical imaging system to generate one or more anatomical images; and
a computer system coupled to at least one of the emission tomography scanner and the anatomical imaging system to perform a method, the method comprising:
   processing the anatomical images to obtain an initial attenuation image,
   automatically reconstructing, by a processor, an emission image and a corrected attenuation image from the acquired emission scan data, the corrected attenuation image representing a deformation of the initial attenuation image, wherein automatically reconstructing the emission image and the corrected attenuation image from the acquired emission scan data comprises:

determining a cost function based on a statistical model for emission scan data as a function of an emission image and a corrected attenuation image, the corrected attenuation image representing a deformation of the initial attenuation image, providing a deformation model that is parameterized by deformation parameters to represent the deformation of the initial attenuation image, calculating the emission image and the deformation parameters to minimize the cost function by using a numerical algorithm, and generating the corrected attenuation image by using the calculated deformation parameters, calculating a final reconstructed emission image based on at least one of: (i) the automatically reconstructed emission image, and (ii) the corrected attenuation image, and outputting the final reconstructed emission image by performing at least one of: (i) storing the final reconstructed emission image in a data storage system, or (ii) displaying the final reconstructed emission image on a display system.

18. The system of claim 17, wherein acquiring emission scan data comprises at least one of: (i) respiratory gating and acquiring one or more gates of the respiratory gated emission scan data, (ii) cardiac gating and acquiring one or more gates of the cardiac gated emission scan data, and (iii) dual cardiac-respiratory gating and acquiring one or more gates of the dual cardiac-respiratory gated emission scan data.

19. A method for reconstructing a nuclear medicine image, comprising:

acquiring emission scan data using an emission tomography scanner;

generating one or more anatomical images using an anatomical imaging system;

processing the anatomical images to obtain an initial attenuation image;

automatically reconstructing, by a processor, one or more emission images and one or more corrected attenuation images from the acquired emission scan data, wherein automatically reconstructing the one or more emission images and the one or more corrected attenuation images comprises:

determining a cost function based on a statistical model for emission scan data as a function of one or more emission images and one or more corrected attenuation images, at least one of the corrected attenuation images representing a deformation of the initial attenuation image, providing a deformation model that is parameterized by deformation parameters to represent the one or more deformations of the initial attenuation image, calculating the one or more emission images, the one or more corrected attenuation images and the deformation parameters to minimize the cost function by using a numerical algorithm, and generating one or more final corrected attenuation images based on at least one of: (i) the calculated one or more corrected attenuation images, or (ii) the calculated deformation parameters;

calculating one or more final reconstructed emission images based on at least one of: (i) the automatically reconstructed one or more emission images, or (ii) the one or more final corrected attenuation images; and outputting the one or more final reconstructed emission images by performing at least one of: (i) storing the one or more final reconstructed emission images in a data storage system, or (ii) displaying the one or more final reconstructed emission images on a display system.

20. The method of claim 19, wherein the one or more corrected attenuation images include a corrected attenuation image for each gate of one of: (i) respiratory gates, (ii) cardiac gates, or (iii) dual cardiac-respiratory gates.

21. The method of claim 19, wherein the one or more emission images include an emission image for each gate of one of: (i) respiratory gates, (ii) cardiac gates, or (iii) dual cardiac-respiratory gates.

22. The method of claim 19, wherein automatically reconstructing the one or more emission images and the one or more corrected attenuation images further comprises:

determining a cost function based on a statistical model for emission scan data as a function of one or more emission images and one or more corrected attenuation images, the one or more emission images including a motion-corrected emission image, at least one of the emission images representing a deformation of the motion-corrected emission image, at least one of the corrected attenuation images representing a deformation of the initial attenuation image, providing a deformation model that is parameterized by deformation parameters to represent the deformations of the motion-corrected emission image and the initial attenuation image, calculating the one or more emission images, the one or more corrected attenuation images and the deformation parameters to minimize the cost function by using a numerical algorithm, and generating one or more final corrected attenuation images based on at least one of: (i) the calculated one or more corrected attenuation images, or (ii) the calculated deformation parameters.

23. The method of claim 19, wherein one or more final reconstructed emission images includes the calculated motion-corrected emission image.

24. The method of claim 19, wherein the cost function includes a dissimilarity function that quantifies the dissimilarity between the motion-corrected emission image and an emission image for a gate of one of: (i) respiratory gates, (ii) cardiac gates, or (iii) dual cardiac-respiratory gates.

25. The method of claim 19, wherein the cost function includes a dissimilarity function that quantifies the dissimilarity between the corrected attenuation image and an attenuation image for a gate of one of: (i) respiratory gates, (ii) cardiac gates, or (iii) dual cardiac-respiratory gates.

* * * * *